United States Patent
Imura et al.

(10) Patent No.: US 11,863,900 B2
(45) Date of Patent: Jan. 2, 2024

(54) IMAGE GENERATION APPARATUS AND IMAGE DISPLAY SYSTEM FOR SUPERIMPOSITION OF THREE-DIMENSIONAL OBJECTS INTO BIRD'S VIEW IMAGES

(71) Applicant: DENSO CORPORATION, Kariya (JP)

(72) Inventors: Shingo Imura, Kariya (JP); Hirohiko Yanagawa, Kariya (JP); Woocheol Shin, Kariya (JP)

(73) Assignee: DENSO CORPORATION, Kariya (JP)

( * ) Notice: Subject to any disclaimer, the term of this patent is extended or adjusted under 35 U.S.C. 154(b) by 155 days.

(21) Appl. No.: 17/357,745

(22) Filed: Jun. 24, 2021

(65) Prior Publication Data
US 2021/0321049 A1    Oct. 14, 2021

Related U.S. Application Data

(63) Continuation of application No. PCT/JP2019/048703, filed on Dec. 12, 2019.

(30) Foreign Application Priority Data

Dec. 26, 2018 (JP) ................................ 2018-243138

(51) Int. Cl.
*H04N 5/262* (2006.01)
*G06T 7/70* (2017.01)
(Continued)

(52) U.S. Cl.
CPC ............ *H04N 5/2628* (2013.01); *B60R 1/00* (2013.01); *G06T 7/20* (2013.01); *G06T 7/70* (2017.01);
(Continued)

(58) Field of Classification Search
CPC .. G06T 7/70; G06T 7/20; G06T 15/60; G06T 2207/30252; G06V 20/56; B60R 1/00
See application file for complete search history.

(56) References Cited

U.S. PATENT DOCUMENTS

| | | | |
|---|---|---|---|
| 2010/0259372 A1* | 10/2010 | Hideshiro | H04N 7/181 340/435 |
| 2012/0069153 A1* | 3/2012 | Mochizuki | B60R 1/00 348/148 |

(Continued)

FOREIGN PATENT DOCUMENTS

| | | | |
|---|---|---|---|
| JP | 7-223488 A | | 8/1995 |
| JP | 07223488 A | * | 8/1995 |

(Continued)

*Primary Examiner* — Terrell M Robinson
(74) *Attorney, Agent, or Firm* — MASCHOFF BRENNAN

(57) ABSTRACT

In an image generation apparatus, an image acquisition unit is configured to acquire, from at least one camera operable to capture an image of surroundings of a vehicle, a captured image. A bird's-eye view image generation unit is configured to generate a bird's-eye view image from the captured image. A three-dimensional object recognition unit is configured to recognize a three-dimensional object in the captured image. A superimposition-image acquisition unit is configured to acquire a superimposition image that represents the three-dimensional object recognized by the three-dimensional object recognition unit, by performing a process depending on a type of the three-dimensional object recognized by the three-dimensional object recognition unit. A superimposition unit is configured to superimpose, onto the bird's-eye view image, the superimposition image acquired by the superimposition-image acquisition unit, at a position where the three-dimensional object is present in the bird's-eye view image.

16 Claims, 6 Drawing Sheets

(51) Int. Cl.
  *B60R 1/00*   (2022.01)
  *G06T 7/20*   (2017.01)
  *G06T 15/60*   (2006.01)
  *H04N 5/272*   (2006.01)
  *H04N 7/18*   (2006.01)
  *G06V 20/56*   (2022.01)
  *G06V 20/64*   (2022.01)
  *G06V 40/10*   (2022.01)

(52) U.S. Cl.
  CPC .............. *G06T 15/60* (2013.01); *G06V 20/56* (2022.01); *G06V 20/64* (2022.01); *G06V 40/103* (2022.01); *H04N 5/272* (2013.01); *H04N 7/181* (2013.01); *B60R 2300/304* (2013.01); *B60R 2300/607* (2013.01); *G06T 2207/30252* (2013.01); *G06V 2201/08* (2022.01)

(56) References Cited

U.S. PATENT DOCUMENTS

| | | | |
|---|---|---|---|
| 2014/0063197 A1 | 3/2014 | Yamamoto et al. | |
| 2016/0035135 A1* | 2/2016 | Park | G02B 27/017 |
| | | | 345/633 |
| 2017/0316278 A1* | 11/2017 | Guerreiro | G06F 18/213 |
| 2018/0025508 A1* | 1/2018 | Lee | G06T 7/73 |
| | | | 382/154 |

FOREIGN PATENT DOCUMENTS

| | | | |
|---|---|---|---|
| JP | 2012-257106 A | | 12/2012 |
| JP | 5516998 B2 | | 4/2014 |
| JP | 2018-74286 A | | 5/2018 |
| JP | 2018074286 A | * | 5/2018 |

* cited by examiner

FIG.5
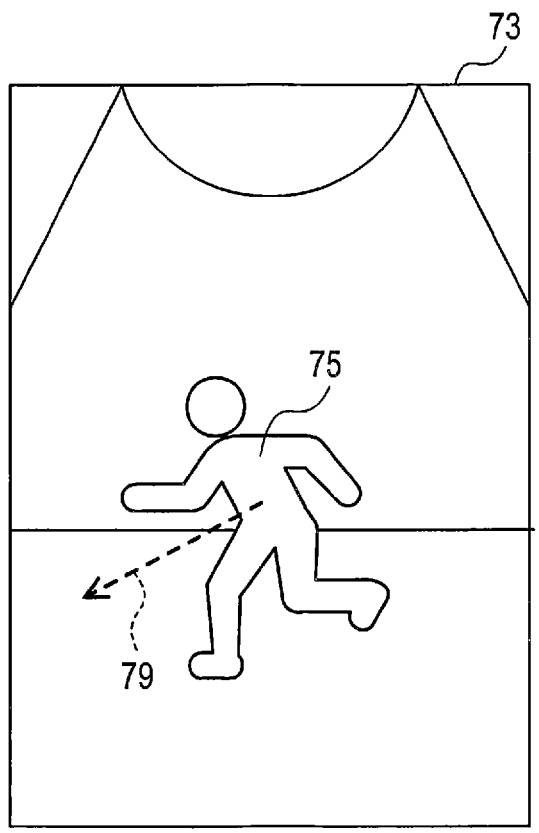
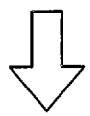
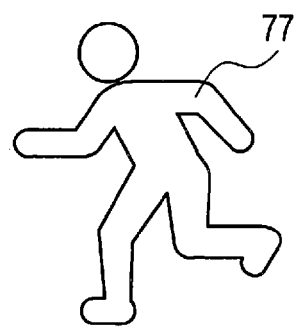

IMAGE GENERATION APPARATUS AND IMAGE DISPLAY SYSTEM FOR SUPERIMPOSITION OF THREE-DIMENSIONAL OBJECTS INTO BIRD'S VIEW IMAGES

CROSS-REFERENCE TO RELATED APPLICATION

This international application claims the benefit of priority from Japanese Patent Application No. 2018-243138 filed with the Japan Patent Office on Dec. 26, 2018, the entire contents of which are incorporated herein by reference.

BACKGROUND

Technical field

This disclosure relates to an image generation apparatus and an image display system.

Related Art

A known image generation apparatus acquires captured images from a camera that captures images of surroundings of a vehicle. The image generation apparatus generates a bird's-eye view image based on the captured images. In the presence of a three-dimensional object appearing in the captured images, the image generation apparatus superimposes a substitute image at a position where the three-dimensional object is present in the bird's-eye view image. The substitute image is an image that represents the three-dimensional object. The substitute image is pre-stored in a database.

BRIEF DESCRIPTION OF THE DRAWINGS

In the accompanying drawings:

FIG. 5 is an illustration of extracting a specific portion from a captured image.

DESCRIPTION OF SPECIFIC EMBODIMENTS

Figure 1:
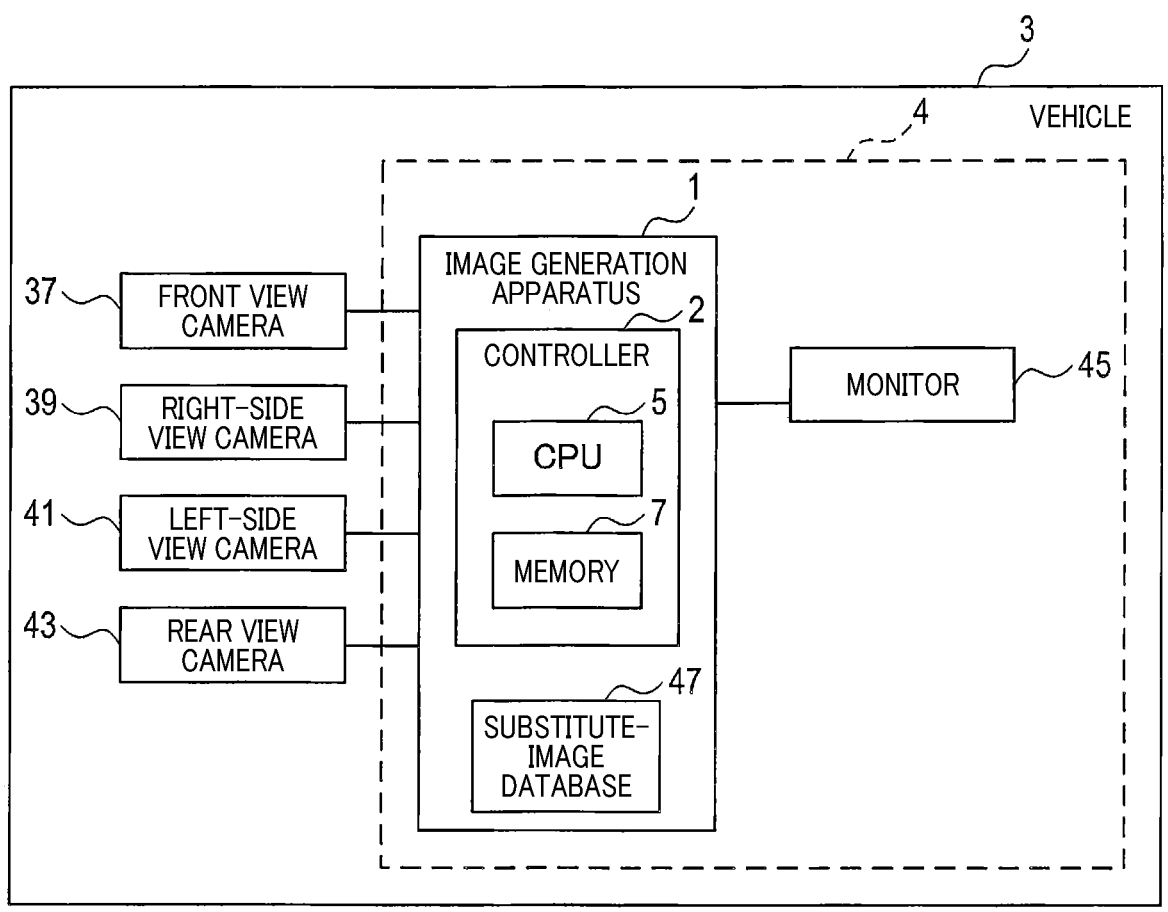
FIG. 1 is a block diagram of an image generation apparatus.

The above known image generation apparatus, as disclosed in JP-B-5516998, is configured to substitute the substitute image pre-stored in the database for any three-dimensional object. As a result of detailed research performed by the present inventors, an issue was found that such a configuration of the known image generation apparatus may cause the user to feel discomfort when looking at the bird's-eye view image and may provide an unattractive appearance to the bird's-eye view image.

In view of the foregoing, it is desired to have an image generation apparatus and an image display system that are less likely to cause a user to feel discomfort when looking at a bird's-eye view image and capable of providing an attractive appearance to the bird's-eye view image.

A first aspect of the present disclosure provides an image generation apparatus including: an image acquisition unit configured to acquire, from at least one camera operable to capture an image of surroundings of a vehicle, a captured image; a bird's-eye view image generation unit configured to generate a bird's-eye view image from the captured image; a three-dimensional object recognition unit configured to recognize a three-dimensional object in the captured image; a superimposition-image acquisition unit configured to acquire a superimposition image that represents the three-dimensional object recognized by the three-dimensional object recognition unit, by performing a process depending on a type of the three-dimensional object recognized by the three-dimensional object recognition unit; and a superimposition unit configured to superimpose, onto the bird's-eye view image, the superimposition image acquired by the superimposition-image acquisition unit, at a position where the three-dimensional object is present in the bird's-eye view image.

The image generation apparatus according to the first aspect of the present disclosure is configured to acquire a superimposition image that represents a three-dimensional object, by performing a process depending on a type of the three-dimensional object. Therefore, the image generation apparatus according to the first aspect of the present disclosure is less likely to cause a user to feel discomfort when looking at the bird's-eye view image and capable of generating the bird's-eye view image having an attractive appearance.

A second aspect of the present disclosure provides an image generation apparatus including: an image acquisition unit configured to acquire, from at least one camera operable to capture an image of surroundings of a vehicle, a captured image; a bird's-eye view image generation unit configured to generate a bird's-eye view image from the captured image; a three-dimensional object recognition unit configured to recognize a specific three-dimensional object that is a pedestrian or a two-wheeled vehicle in the captured image; and a superimposition unit configured to superimpose, onto the bird's-eye view image, a portion of the captured image that represents the specific three-dimensional object, at a position where the specific three-dimensional object is present in the bird's-eye view image.

The image generation apparatus according to the second aspect of the present disclosure is less likely to cause a user to feel discomfort when looking at the bird's-eye view image and capable of generating the bird's-eye view image having an attractive appearance.

One embodiment of the present disclosure will now be described with reference to the accompanying drawings.

First Embodiment

1. Configuration of Image Generation Apparatus 1

A configuration of an image generation apparatus 1 will be described based on FIGS. 1 and 2. As illustrated in FIG. 1, the image generation apparatus 1 is mounted to a vehicle 3. The image generation apparatus 1 includes a controller 2 and a substitute-image database 47. The controller 2 includes at least one microcomputer formed of a central processing unit (CPU) 5 and a semiconductor memory (hereinafter referred to as memory 7) such a random-access memory (RAM), a read-only memory (ROM), and the like.

Various functions of the controller 2 may be implemented by the CPU 5 executing one or more programs stored in a non-transitory tangible storage medium. In the present embodiment, the memory 7 corresponds to the non-transitory tangible storage medium. In addition, a method corresponding to the one or more programs is implemented by execution of the one or more programs. The controller 2 may include a single or a plurality of microcomputers.

Figure 2:
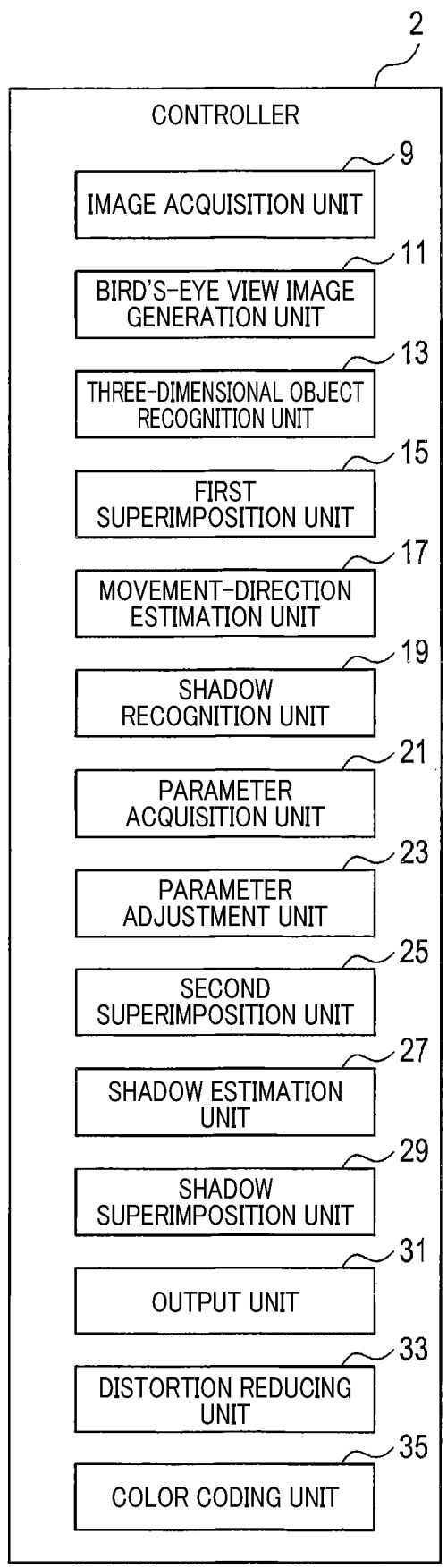
FIG. 2 is a functional block diagram of a controller.
Figure 3:
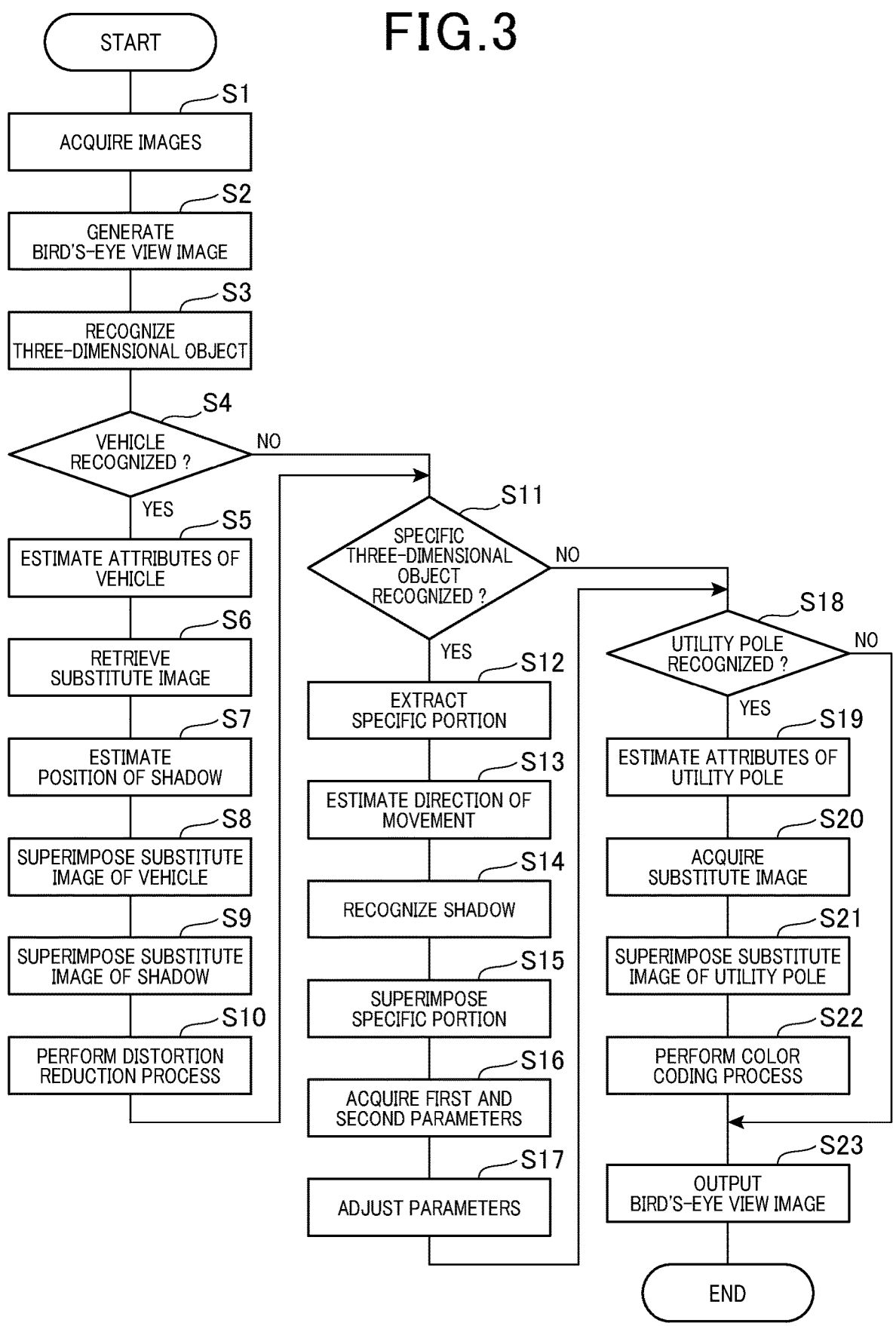
FIG. 3 is a flowchart of a process performed by the image generation apparatus.

As illustrated in FIG. 2, the controller 2 includes an image acquisition unit 9, a bird's-eye view image generation unit 11, a three-dimensional object recognition unit 13, a first superimposition unit 15, a movement-direction estimation unit 17, a shadow recognition unit 19, a parameter acquisition unit 21, a parameter adjustment unit 23, a second superimposition unit 25, a shadow estimation unit 27, a shadow superimposition unit 29, an output unit 31, a distortion reducing unit 33, and a color coding unit 35. The three-dimensional object recognition unit 13 corresponds to a specific three-dimensional object recognition unit and a vehicle recognition unit. The first superimposition unit 15 and the second superimposition unit 25 correspond to a superimposition-image acquisition unit and a superimposition unit. The second superimposition unit 25 corresponds to a vehicle superimposition unit. The distortion reducing unit 33 corresponds to a substitution unit. The substitute-image database 47 stores various substitute images. The substitute images will be described later. As illustrated in FIG. 1, the vehicle 3 includes a front view camera 37, a right-side view camera 39, a left-side view camera 41, a rear view camera 43, and a monitor 45, as well as the image generation apparatus 1. These cameras are connected to the image generation apparatus 1.

The front view camera 37 captures images in the forward direction of the vehicle 3. The right-side view camera 39 captures images in the rightward direction of vehicle 3. The left-side view camera 41 captures images in the leftward direction of vehicle 3. The rear view camera 43 captures images in the rearward direction of vehicle 3.

A portion of an imaging range of the front view camera 37 overlaps a portion of an imaging range of the right-side view camera 39. A portion of the imaging range of the right-side view camera 39 overlaps a portion of an imaging range of the rear view camera 43.

A portion of the imaging range of the rear view camera 43 overlaps a portion of an imaging range of the left-side view camera 41. A portion of the imaging range of the front view camera 37 overlaps a portion of the imaging range of the left-side view camera 41.

The monitor 45 is installed in a vehicle cabin of the vehicle 3. The monitor 45 is able to display images. The monitor 45 is able to display the images generated by the image generation apparatus 1. The monitor 45 corresponds to an image display device. The combination of the image generation apparatus 1 and the monitor 45 form the image display system 4.

As described above, the substitute-image database 47 stores substitute images of three-dimensional objects. The substitute images of three-dimensional objects are images that represent the three-dimensional objects. The substitute images of three-dimensional objects may include substitute images of vehicles and substitute images of utility poles.

The substitute images of vehicles are images that represent the vehicles as viewed from above. The substitute images of utility poles are images that represent the utility poles as viewed from above. The substitute images of utility poles show tops of the utility poles.

The substitute-image database 47 stores substitute images of a plurality of types of vehicles. The substitute image of each vehicle is associated with vehicle attributes, where the vehicle attributes are different depending on the substitute image of the vehicle. The vehicle attributes include a vehicle color, a vehicle type, a vehicle orientation, and the like.

The substitute-image database 47 stores substitute images of a plurality of types of utility poles. The substitute image of each utility pole is associated with utility-pole attributes, where the utility-pole attributes are different depending on the substitute image of the utility pole. The utility-pole attributes include a utility-pole color and the like. The substitute-image database 47 also stores substitute images of shadows of vehicles.

2. Process Performed by Image Generation Apparatus 1

The process performed by the image generation apparatus 1 will now be described with reference to FIGS. 3 to 6. At step S1 of FIG. 3, the image acquisition unit 9 acquires captured images from the front view camera 37, the right-side view camera 39, the left-side view camera 41, and the rear view camera 43.

At step S2, the bird's-eye view image generation unit 11 generates a bird's-eye view image based on the captured images acquired at step S1. The bird's-eye view image generation unit 11 generates the bird's-eye view image by performing a projective transformation from an upper virtual viewpoint on the captured images.

At step S3, the three-dimensional object recognition unit 13 performs a process of recognizing a three-dimensional object in each of the captured images acquired at step S1. Examples of the three-dimensional object include a vehicle, a pedestrian, a two-wheeled vehicle, a fixed object and the like. The vehicle means a vehicle other than a two-wheeled vehicle. Examples of the fixed object include, for example, a utility pole.

At step S4, the three-dimensional object recognition unit 13 determines whether a vehicle has been recognized at step S3. If a vehicle has been recognized, the process flow proceeds to step S5. If no vehicle has been recognized, the process flow proceeds to step 11.

At step S5, the second superimposition unit 25 estimates attributes of the vehicle recognized at step S3.

At step S6, the second superimposition unit 25 retrieves, from the substitute-image database 47, a substitute image of the vehicle associated with the attributes of the vehicle estimated at step S5. The substitute image of the vehicle corresponds to a superimposition image that represents a three-dimensional object. The substitute-image database 47 corresponds to a storage medium. Retrieving the substitute image from the substitute-image database 47 corresponds to a process of retrieving the superimposition image from the storage medium.

At step S7, the shadow estimation unit 27 estimates a position of a shadow of the vehicle recognized at step S3 in the bird's-eye view image generated at step S2.

A method for the shadow estimation unit 27 to estimate a position of a shadow of a three-dimensional object in the bird's-eye view image includes a first method and a second method. The first method includes recognizing a three-dimensional object and a shadow of the three-dimensional object in respective captured images, determining a relative position of the recognized shadow to the recognized three-dimensional object, and applying the relative position of the shadow relative to the three-dimensional object to the bird's-eye view image, thereby estimating the position of the shadow of the three-dimensional object in the bird's-eye view image. The second method includes estimating a position of a shadow of a three-dimensional object in the bird's-eye view image based on date, time, latitude and longitude of a location of the vehicle 3.

At step S8, the second superimposition unit 25 superimposes, onto the bird's-eye view image generated at step S2, the substitute image of the vehicle retrieved at step S6, at a position where the vehicle recognized at step S3 is present in the bird's-eye view image. The second superimposition unit 25 superimposes the substitute image onto the bird's-eye view image such that a direction of movement of the vehicle in the substitute image is congruent with a direction of movement of the vehicle in the bird's-eye view image.

Figure 4:
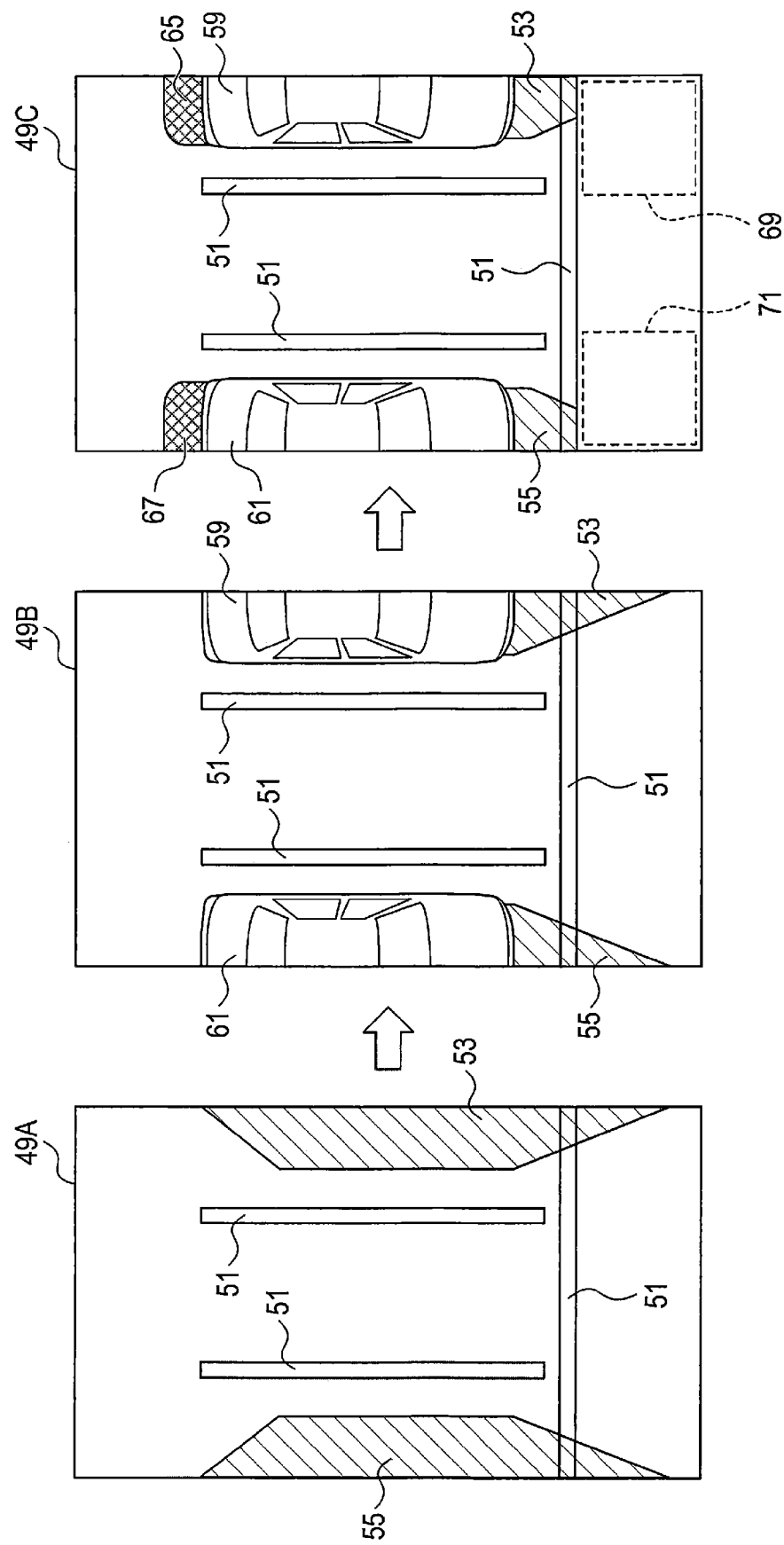
FIG. 4 is an illustration of generating a bird's-eye view image.

FIG. 4 illustrates an example of superimposing the substitute image of the vehicle. The bird's-eye view image 49A is a bird's-eye view image generated at step S2. White lines 51 are displayed in the bird's-eye view image 49A. Distorted areas 53 and 55 are displayed in the bird's-eye view image 49A. The distorted areas 53 and 55 are areas generated as a result of projective transformation of the vehicle appearing in the captured images from the upward virtual viewing point. That is, each of the distorted areas 53 and 55 is an area where a vehicle having a shape distorted is present in the bird's-eye view image.

The bird's-eye view image 49B is a bird's-eye view image generated by superimposing the substitute images of respective vehicles 59 and 61 onto the bird's-eye view image 49A. In the bird's-eye view image 49B, a portion of the distorted area 53 is covered with the substitute image 59 of a vehicle, but the rest of the distorted area 53 is outside of the substitute image 59. In addition, in the bird's-eye view image 49B, a portion of the distorted area 55 is covered with the substitute image 61 of another vehicle, but the rest of the distorted area 55 is outside of the substitute image 61.

At step S9, the shadow estimation unit 29 retrieves, from the substitute-image database 47, a substitute image of the shadow of the vehicle. The shadow estimation unit 29 then superimposes the substitute image of the shadow of the vehicle at the position of the shadow estimated at step S7 onto the bird's-eye view image.

FIG. 4 illustrates an example of superimposing the substitute image of the shadow of the vehicle. The bird's-eye view image 49C is a bird's-eye view image acquired by superimposing the substitute images 65 and 67 of shadows of the vehicles onto the bird's-eye view image 49B. The positions of the substitute images 65 and 67 for shadows of the vehicles are the positions of the shadows estimated at step S7.

At step S10, the distortion reducing unit 33 performs a distortion reduction process. The distortion reduction process is a process of erasing at least a portion of the distorted area appearing in the bird's-eye view image using the captured image in which the vehicle does not appear. The distortion reduction process will be described based on an example illustrated in FIG. 4.

The bird's-eye view image 49C includes distorted areas 53 and 55. The distorted area 53 is arising from a vehicle appearing in the captured image captured by the right-side view camera 39. The distorted area 55 is arising from a vehicle appearing in the captured image captured by the left-side view camera 41. The distorted areas 53 and 55 correspond to areas where the respective vehicles are appearing in the bird's-eye view image 49C. The captured image captured by the rear view camera 43 presents neither the vehicle appearing in the imaging range of the right-side view camera 39 nor the vehicle appearing in the imaging range of the left-side view camera 41. The imaging range of the rear view camera 43 includes areas 69 and 71 described later. Prior to performing a distortion reduction process, the areas 69 and 71 in the bird's-eye view image 49C are generated using the captured images captured by the right-side view camera 39 and the left-side view camera 41.

In the distortion reduction process, the areas 69 and 71 including portions of the respective distorted areas 53 and 55, in the bird's-eye view image 49C, are replaced with portions of the image obtained by converting the captured image captured by the rear view camera 43 into the bird's-eye view image. The areas 69 and 71 are areas, in the bird's-eye view image 49C, including distortions arising from the respective vehicles and outside of the substitute images 59 and 61. The areas 69 and 71 correspond to specific areas. Since there is no vehicle appearing in the captured image captured by the rear view camera 43, no distortions are present in the areas 69 and 71 after completion of the distortion reduction process.

At step S11, the three-dimensional object recognition unit 13 determines whether a specific three-dimensional object has been recognized at step S3. The specific three-dimensional object includes a pedestrian or a two-wheeled vehicle. The two-wheeled vehicle includes a bicycle or a motorcycle. If a specific three-dimensional object has been recognized, the process flow proceeds to step 12. If no specific three-dimensional object has been recognized, the process flow proceeds to step 18.

At step S12, the first superimposition unit 15 extracts a portion (hereinafter referred to as a specific portion 77) representing the specific three-dimensional object from the captured image in which the specific three-dimensional object is appearing. FIG. 5 illustrates an example of extracting the specific portion 77. A pedestrian 75 is appearing in the captured image 73. The first superimposition unit 15 extracts the specific portion 77 representing the pedestrian 75 from the captured image 73. The specific portion 77 corresponds to a superimposition image. Extracting the specific portion 77 from the captured image corresponds to acquiring the superimposition image using a portion of the captured image that represents the specific three-dimensional object.

At step S13, the movement-direction estimation unit 17 estimates a direction of movement of the specific three-dimensional object in the captured image. FIG. 5 illustrates an example of estimating a direction of movement of the specific three-dimensional object. The movement-direction estimation unit 17 estimates a direction of movement 79 of the pedestrian 75. The movement-direction estimation unit 17 is operable to estimate a direction of movement of the specific three-dimensional object from, for example, the orientation of the specific three-dimensional object, the heading of a road where the specific three-dimensional object is present, and the like. The direction of movement of the specific three-dimensional object has a certain relationship with the orientation of the specific three-dimensional object.

At step S14, the shadow recognition unit 19 recognizes a shadow of the specific three-dimensional object recognized at step S3 in the bird's-eye view image.

At step S15, the first superimposition unit 15 superimposes, onto the bird's-eye view image, the specific portion 77 extracted at step S12, at a position in the bird's-eye view image where the specific three-dimensional object recognized at step S3 is present.

Figure 6:
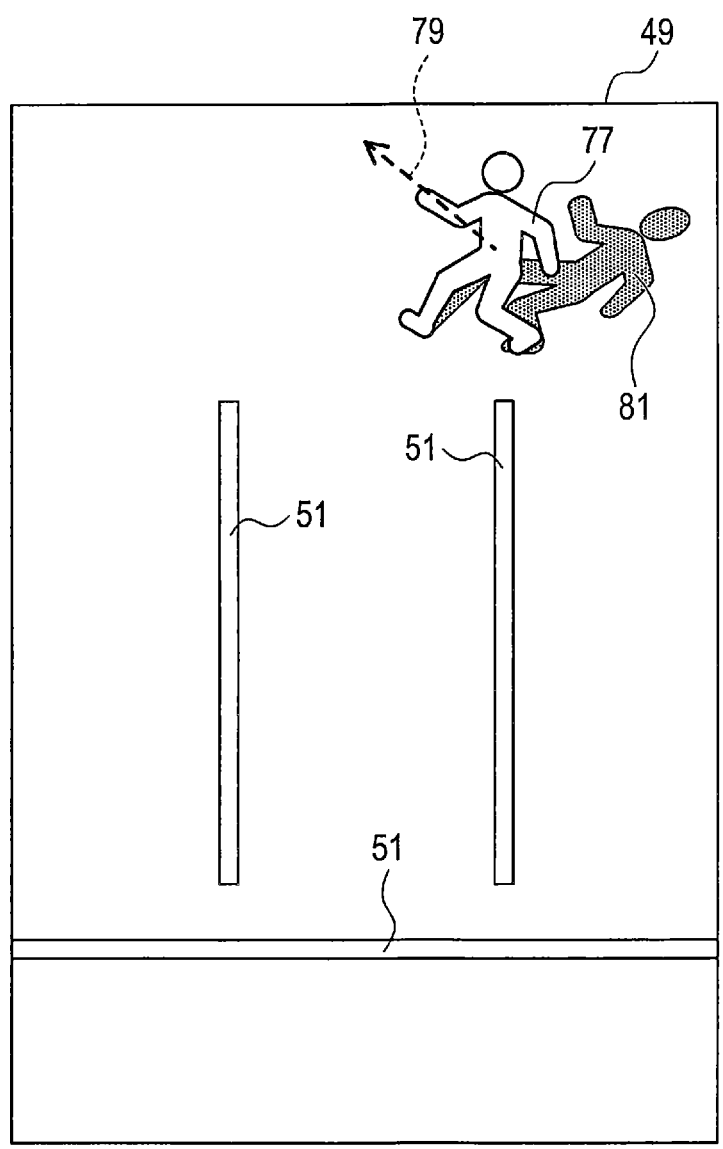
FIG. 6 is an illustration of superimposing the specific portion onto a bird's-eye view image.

FIG. 6 illustrates an example of superimposing the specific portion 77, which was extracted at step S12, onto the bird's-eye view image. The specific portion 77 is superimposed onto the bird's-eye view image 49. In bird's-eye view image 49, the specific portion 77 is located at a position where the specific three-dimensional object recognized at step S3 is present.

The first superimposition unit 15 may reduce the size of the specific portion 77 before superimposing the specific portion 77 onto the bird's-eye view image 49. The size reduction ratio may be set as appropriate. In addition, the first superimposition unit 15 may superimpose the specific portion 77 onto the bird's-eye view image 49 without reducing the size of the specific portion 77. Alternatively, the first superimposition unit 15 may increase the size of the specific portion 77 before superimposing the specific portion 77.

The direction of movement 79 in the captured image 73 and the direction of movement 79 in the bird's-eye view image 49 are congruent with each other. For example, if the direction of movement 79 in the captured image 73 is northward, the direction of movement 79 in bird's-eye view image 49 is also northward. The position of the specific portion 77 in the bird's-eye view image 49 is a position where the shadow 81 recognized at step S14 occurs.

At step S16, the parameter acquisition unit 21 acquires a first parameter and a second parameter. The first parameter is the luminance or contrast of the specific portion 77. The second parameter is the luminance or contrast around the position where the specific three-dimensional object recognized at step S3 is present in the bird's-eye view image.

At step S17, the parameter adjustment unit 23 adjusts the first parameter or the second parameter such that a difference between the first parameter and the second parameter decreases. The parameter adjustment unit 23 may vary the first parameter such that the difference between the first parameter and the second parameter decreases. Alternatively, the parameter adjustment unit 23 may vary the second parameter such that the difference between the first parameter and the second parameter decreases. Still alternatively, the parameter adjustment unit 23 may vary both the first parameter and the second parameter such that the difference between the first parameter and the second parameter decreases.

At step S18, the three-dimensional object recognition unit 13 determines whether a utility pole has been recognized at step S3. If the utility pole has been recognized, the process flow proceeds to step 19. If no utility pole has been recognized, the process flow proceeds to step 23.

At step S19, the second superimposition unit 25 estimates attributes of the utility pole recognized at step S3.

At step S20, the second superimposition unit 25 retrieves, from the substitute-image database 47, a substitute image of the utility pole associated with the attributes of the utility pole estimated at step S19. The substitute image of the utility pole corresponds to a superimposition image that represents a three-dimensional object. The substitute-image database 47 corresponds to a storage medium. Retrieving the substitute image from the substitute-image database 47 corresponds to a process of retrieving a superimposition image from a storage medium.

At step S21, the second superimposition unit 25 superimposes, onto the bird's-eye view image, the substitute image of the utility pole retrieved at step S20, at a position where the top of the utility pole recognized at step S3 is present in the bird's-eye view image. The top of the utility pole means an upper portion of the utility pole that is appearing in the bird's-eye view image.

At step 22, the color coding unit 35 performs a color coding process on the bird's-eye view image. The color coding process is a process of dividing the bird's-eye view image into a plurality of types of areas: an area where a three-dimensional object is present; an object-free area; and an undetermined area, and assigning different colors to these areas. The object-free area is an area that appears in at least one of the captured images, but has no three-dimensional object appearing. The undetermined area is an area that does not appear in any one of the captured images.

At step S23, the output unit 31 outputs the bird's-eye view image to the monitor 45. The output bird's-eye view image corresponds to an image generated by the image generation apparatus 1. The monitor 45 displays the bird's-eye view image.

3. Advantages Provided by Image Generation Apparatus 1

(1A) The image generation apparatus 1 acquires a superimposition image by a different process depending on the type of the recognized three-dimensional object. That is, in a case where the type of recognized three-dimensional object is a pedestrian or a two-wheeled vehicle, the image generation apparatus 1 generates a superimposition image using a portion of the captured image representing the pedestrian or the two-wheeled vehicle. In addition, in a case where the type of the recognized three-dimensional object is a vehicle or a utility pole, the image generation apparatus 1 performs a process of retrieving a superimposition image from the substitute-image database 47. Therefore, the image generation apparatus 1 is able to generate the bird's-eye view image that is less likely to cause a user to feel discomfort and has an attractive appearance.

(1B) The image generation apparatus 1 superimposes, onto the bird's-eye view image, a specific portion 77, at a position where a specific three-dimensional object is present in the bird's-eye view image. The specific portion 77 is a portion of the captured image that represents the specific three-dimensional object. Therefore, the attributes of the specific portion 77 superimposed onto the bird's-eye view image coincide with attributes of an actual specific three-dimensional object. Thus, when the user looks at the bird's-eye view image, the user is less likely to feel discomfort.

(1C) The image generation apparatus 1 estimates a direction of movement of the specific three-dimensional object in the captured image. In the bird's-eye view image generated by image generation apparatus 1, the direction of movement of the specific three-dimensional object in the captured image and a direction of movement of the specific three-dimensional object in the bird's-eye view image are congruent with each other. Therefore, the user can readily perceive the direction of movement of the specific three-dimensional object by looking at the bird's-eye view image.

(1D) The image generation apparatus 1 recognizes a shadow of the specific three-dimensional object in the bird's-eye view image. In the bird's-eye view image generated by the image generation apparatus 1, the position of the specific three-dimensional object represented by the specific portion 77 is a position where the recognized shadow is appearing. Therefore, the image generation apparatus 1 is able to accurately superimpose the specific portion 77 onto the bird's-eye view image. Furthermore, since the position of the specific three-dimensional object represented by the specific portion 77 and the position of the recognized shadow are unlikely to deviate from each other, it is less likely to cause a user to feel discomfort.

(1E) The image generation apparatus 1 acquires a first parameter and a second parameter. The image generation apparatus 1 adjusts the first parameter or the second parameter such that a difference between the first parameter and the second parameter decreases. Whereby, in the bird's-eye view image, a difference in luminance or contrast between the specific portion 77 and its surroundings may decrease. Therefore, the user is less likely to feel discomfort when looking at the bird's-eye view image.

(1F) The image generation apparatus 1 recognizes a vehicle in the captured images. The image generation apparatus 1 superimposes a substitute image of the vehicle at a position where the recognized vehicle is present in the bird's-eye view image. The image generation apparatus 1 estimates a position of a shadow of the recognized vehicle in the bird's-eye view image. The image generation apparatus 1 superimposes, onto the bird's-eye view image, the substitute image of the shadow of the vehicle, at the estimated position of the shadow in the bird's-eye view image.

The substitute image of the vehicle and the substitute image of the shadow of the vehicle are thus superimposed on the bird's-eye view image generated by image generation apparatus 1. Therefore, the user can more readily recognize a vehicle when looking at the bird's-eye view image.

(1G) The image generation apparatus 1 replaces a portion of the bird's-eye view image where a vehicle is present, outside of the superimposition image of the vehicle, with an image acquired by converting a captured image captured by another camera into the bird's-eye view image. The captured image captured by the other camera is a captured image having the vehicle not appearing in the imaging range and the portion outside of the superimposition image included in the imaging range. Therefore, the image generation apparatus 1 is able to reduce portions of the bird's-eye view image in which a vehicle distorted in shape appears.

OTHER EMBODIMENTS

While the embodiments of the present disclosure have been described above, the present disclosure is not limited to the above-described embodiments, and various variations and modifications are possible.

(1) The specific portion 77 may or may not include a portion of the captured image other than the specific three-dimensional object. The specific portion 77 may represent the entire specific three-dimensional object, or may represent a portion of the specific three-dimensional object.

(2) The second superimposition unit 25 may not retrieve a substitute image of a vehicle from the substitute-image database 47, but may generate it each time according to the attributes of the vehicle estimated at step S5.

(3) Also when superimposing the substitute image of the vehicle or utility pole onto the bird's-eye view image, a shadow of the three-dimensional object may be recognized in the bird's-eye view image as at step S14. Whereby, the substitute image may be superimposed onto the bird's-eye view image such that the three-dimensional object represented by the substitute image is located at a position where the recognized shadow is appearing.

(4) Also when superimposing the substitute image of the vehicle or utility pole onto the bird's-eye view image, a first parameter and a second parameter may be acquired as at step S16. The first parameter may be the luminance or contrast of the substitute image. Whereby, as at step S17, the first parameter or the second parameter may be adjusted such that a difference between the first parameter and the second parameter decreases.

(5) Also when superimposing the substitute image of the vehicle or utility pole onto the bird's-eye view image, a position of the shadow of the three-dimensional object in the bird's-eye view image may be estimated as at step S7. Whereby, as at step S9, the substitute image of the shadow may be superimposed onto the bird's-eye view image, at the estimated position of the shadow in the bird's-eye view image.

(6) The image generation apparatus 1 and the technique thereof described in the present disclosure may be implemented by a special purpose computer which is configured with a memory and a processor programmed to execute one or more functions embodied in computer programs. Alternatively, the image generation apparatus 1 and the technique thereof described in the present disclosure may be implemented by a dedicated computer configured as a processor with one or more dedicated hardware logic circuits. Still alternatively, the image generation apparatus 1 and the technique thereof described in the present disclosure may be implemented by one or more dedicated computers, which are configured as a combination of a memory and a processor programmed to perform one or more functions, and a processor which is configured with one or more hardware logic circuits. The computer program may also be stored on a computer readable non- transitory tangible storage medium as instructions to be executed by a computer. The technique for implementing the functions of each unit included in the image generation apparatus 1 may not necessarily include software, and all of the functions may be implemented by one or more hardware modules.

(7) A plurality of functions of one component in the above-described embodiments may be realized by a plurality of components, or one function of one component may be realized by a plurality of components. Further, a plurality of functions of a plurality of components may be realized by one component, or one function to be realized by a plurality of components may be realized by one component. Still further, portion of the components of the above-described embodiments may be omitted. In addition, at least portion of the components of the above-described embodiments may be added to or replaced with the components in another embodiment.

(8) The present disclosure may be implemented in various modes including, as well as the image generation apparatus described above, a system including the image generation apparatus as a constituent element, a program for causing a computer to serve as the image generation apparatus, a non-transitory, tangible computer-readable storage medium, such as a semiconductor memory, storing this program, an image generation method, a driving assistance method, and others.

What is claimed is:

1. An image generation apparatus comprising:
   a non-transitory memory storing one or more computer programs;
   a processor executing the one or more computer programs to:
   acquire, from at least one camera operable to capture an image of surroundings of a vehicle, a captured image;
   generate a bird's-eye view image from the captured image;
   recognize a three-dimensional object in the captured image;
   acquire a superimposition image that represents the recognized three-dimensional object, by performing a process depending on a type of the recognized three-dimensional object; and
   superimpose, onto the bird's-eye view image, the acquired superimposition image, at a position where the three-dimensional object is present in the bird's-eye view image, wherein
the processor further executes one or more programs to,
in response to the type of the recognized three-dimensional object being a first type, acquire the superimposition image by generating it using the captured image, and
in response to the type of the recognized three-dimensional object being a second type that is different from the first type, acquire the superimposition image by retrieving it from superimposition images prestored in a storage medium.

2. The image generation apparatus according to claim 1, wherein
acquiring the superimposition image that represents the recognized three-dimensional object includes at least one of generating the superimposition image using the captured image and retrieving the superimposition image from a storage medium pre-storing the superimposition image.

3. The image generation apparatus according to claim 2, wherein
in response to a type of the recognized three-dimensional object recognized being a pedestrian or a two-wheeled vehicle, the superimposition image is generated using a portion of the captured image, representing the recognized three-dimensional object recognized.

4. The image generation apparatus according to claim 2, wherein
in response to a type of the recognized three-dimensional object recognized being a utility pole, the superimposition image is retrieved from the storage medium, and the superimposition image retrieved from the storage medium is superimposed onto the bird's-eye view image at a position where a top of the utility pole is present in the bird's-eye view image.

5. The image generation apparatus according to claim 2, wherein
in response to a type of the recognized three-dimensional object being a vehicle, the superimposition image is retrieved from the storage medium, and the superimposition image retrieved from the storage medium is superimposed onto the bird's-eye view image, at a position where the vehicle is present in the bird's-eye view image.

6. The image generation apparatus according to claim 5, wherein
the at least one camera comprises a plurality of cameras, and
the processor further executes the one or more computer programs to:
acquire the captured image from each of the plurality of cameras;
generate the bird's-eye view image based on the captured images acquired from the plurality of the cameras; and
replace a specific area of the bird's-eye view image where the vehicle is appearing, outside of the superimposition image of the vehicle, with an image acquired by converting the captured image captured by an other camera, of the plurality of the cameras, than the camera that captured the captured image that was used to generate the specific area, into the bird's-eye view image, the captured image captured by the other camera being a captured image having the vehicle not appearing in an imaging range and the specific area outside of the superimposition image included in the imaging range.

7. The image generation apparatus according to claim 1, wherein
the processor further executes the one or more computer programs to
estimate a direction of movement of the three-dimensional object in the superimposition image,
wherein the superimposition image is superimposed onto the bird's-eye view image such that the direction of movement of the three-dimensional object in the superimposition image is congruent with a direction of movement of the three-dimensional object in the bird's-eye view image.

8. The image generation apparatus according to claim 1, wherein
the processor further executes the one or more computer programs to
recognize a shadow of the three-dimensional object in the bird's-eye view image,
wherein the superimposition image is superimposed onto the bird's-eye view image such that the three-dimensional object represented by the superimposition image is located at a position where the shadow that is recognized appears.

9. The image generation apparatus according to claim 1, wherein
the processor further executes the one or more computer programs to:
acquire a first parameter that is a luminance or contrast of the superimposition image, and a second parameter that is a luminance or contrast around a position where the three-dimensional object is present in the bird's-eye view image; and
adjust the first parameter or the second parameter such that a difference between the first parameter and the second parameter decreases.

10. The image generation apparatus according to claim 1, wherein
the processor further executes the one or more computer programs to:
estimate a position of a shadow of the three-dimensional object in the bird's-eye view image; and
superimpose, onto the bird's-eye view image, a shadow image representing the shadow of the three-dimensional object, at the position of the shadow that is estimated.

11. An image generation apparatus comprising:
a non-transitory memory storing one or more computer programs;
a processor executing the one or more computer programs to:
acquire, from at least one camera operable to capture an image of surroundings of a vehicle, a captured image;
generate a bird's-eye view image from the captured image;
recognize a specific three-dimensional object that is a pedestrian or a two-wheeled vehicle in the captured image; and
superimpose, onto the bird's-eye view image, a portion of the captured image that represents the specific three-dimensional object, at a position where the specific three-dimensional object is present in the bird's-eye view image,
wherein
the processor further executes one or more programs to,
in response to the recognized three-dimensional object being a non-specific three-dimensional object other than the specific three-dimensional object, retrieve a substitute image of the non-specific three-dimensional object from a storage medium in which various substitute images are pre-stored, and superimpose the retrieved substitute image onto the bird's-eye view image, at a position where the non-specific three-dimensional object is present in the bird's-eye view image.

12. The image generation apparatus according to claim 11, wherein the processor further executes the one or more computer programs to estimate a direction of movement of the specific three-dimensional object in the captured image, the portion of the captured image that represents the specific three-dimensional object is superimposed onto the bird's-eye view image such that the direction of movement of the specific three-dimensional object in the captured image is congruent with a direction of movement of the specific three-dimensional object in the bird's-eye view image.

13. The image generation apparatus according to claim 11, wherein the processor further executes the one or more computer programs to recognize a shadow of the specific three-dimensional object in the bird's-eye view image, wherein the portion of the captured image that represents the specific three-dimensional object is superimposed onto the bird's-eye view image such that the specific three-dimensional object is located at a position where the shadow that is recognized appears in the bird's-eye view image.

14. The image generation apparatus according to claim 11, wherein the processor further executes the one or more computer programs to:

acquire a first parameter that is a luminance or contrast of the portion of the captured image that represents the specific three-dimensional object, and a second parameter that is a luminance or contrast around a position where the specific three-dimensional object is present in the bird's-eye view image; and adjust the first parameter or the second parameter such that a difference between the first parameter and the second parameter decreases.

15. The image generation apparatus according to claim 11, wherein the processor further executes the one or more computer programs to:

recognize a vehicle in the captured image;

superimpose, onto the bird's-eye view image, a superimposition image representing the vehicle, at a position where the vehicle that is recognized is present in the bird's-eye view image;

estimate a position of a shadow of the vehicle that is recognized in the bird's-eye view image; and superimpose, onto the bird's-eye view image, a shadow image representing the shadow of the vehicle, at the position of the shadow that is estimated.

16. An image display system comprising:

an image generation apparatus comprising:

a non-transitory memory storing one or more computer programs;

a processor executing the one or more computer programs to:

acquire, from at least one camera operable to capture an image of surroundings of a vehicle, a captured image;

generate a bird's-eye view image from the captured image;

recognize a three-dimensional object in the captured image;

acquire a superimposition image that represents the recognized three-dimensional object, by performing a process depending on a type of the recognized three-dimensional object; and superimpose, onto the bird's-eye view image, the acquired superimposition image, at a position where the three-dimensional object is present in the bird's-eye view image, wherein the processor further executes one or more programs to in response to the type of the recognized three-dimensional object being a first type, acquire the superimposition image by generating it using the captured image, and in response to the type of the recognized three-dimensional object being a second type that is different from the first type, acquire the superimposition image by retrieving it from superimposition images prestored in a storage medium, and an image display device configured to display an image generated by the image generation apparatus.

* * * * *